(12) United States Patent
Schaefer et al.

(10) Patent No.: US 9,121,643 B2
(45) Date of Patent: Sep. 1, 2015

(54) HEAT EXCHANGER

(75) Inventors: Bernd Schaefer, Stuttgart (DE);
Markus Wesner, Stuttgart (DE)

(73) Assignee: MAHLE Behr GmbH & Co. KG, Stuttgart (DE)

( * ) Notice: Subject to any disclaimer, the term of this patent is extended or adjusted under 35 U.S.C. 154(b) by 217 days.

(21) Appl. No.: 13/601,048

(22) Filed: Aug. 31, 2012

(65) Prior Publication Data

US 2013/0061630 A1 Mar. 14, 2013

(30) Foreign Application Priority Data

Aug. 31, 2011 (DE) .......................... 10 2011 081 886

(51) Int. Cl.
| | |
|---|---|
| *F25B 39/02* | (2006.01) |
| *F28D 9/00* | (2006.01) |
| *B60H 1/00* | (2006.01) |
| *H01M 10/625* | (2014.01) |
| *H01M 10/6556* | (2014.01) |
| *H01M 10/6568* | (2014.01) |
| *H01M 10/6569* | (2014.01) |
| *H01M 10/663* | (2014.01) |
| *F28D 21/00* | (2006.01) |

(52) U.S. Cl.
CPC ............ *F28D 9/005* (2013.01); *B60H 1/00278* (2013.01); *F25B 39/022* (2013.01); *H01M 10/5016* (2013.01); *H01M 10/5057* (2013.01); *H01M 10/5077* (2013.01); *H01M 10/5079* (2013.01); *H01M 10/5095* (2013.01); *B60H 2001/00307* (2013.01); *F28D 2021/0085* (2013.01); *H01M 2220/20* (2013.01)

(58) Field of Classification Search
CPC ............................. B60H 1/00278; F25B 39/02
USPC .............. 62/524–526; 165/166–167; 429/120
See application file for complete search history.

(56) References Cited

U.S. PATENT DOCUMENTS

| | | | |
|---|---|---|---|
| 4,114,397 A | 9/1978 | Takahashi et al. | |
| 4,149,390 A * | 4/1979 | Iijima et al. ..................... | 62/524 |
| 4,712,384 A | 12/1987 | Crowe | |
| 6,705,101 B2 | 3/2004 | Brotz et al. | |
| 6,814,133 B2 * | 11/2004 | Yamaguchi ..................... | 165/41 |
| 8,863,542 B2 | 10/2014 | Damsohn et al. | |
| 2009/0249802 A1 | 10/2009 | Nemesh et al. | |

(Continued)

FOREIGN PATENT DOCUMENTS

| | | |
|---|---|---|
| DE | 195 23 475 C1 | 11/1996 |
| DE | 198 05 285 A1 | 8/1999 |

(Continued)

*Primary Examiner* — Cassey D Bauer
(74) *Attorney, Agent, or Firm* — Muncy, Geissler, Olds & Lowe, P.C.

(57) ABSTRACT

In an evaporator having plate-type construction, a plurality of stack plates are stacked atop one another such that a first fluid passage for a first fluid as a refrigerant and a second fluid passage for a second fluid as a coolant is provided and are formed between the stack plates. The stack plates have first apertures for supply and return of the first fluid, second apertures for supply and return of the second fluid, a first inlet opening and outlet opening for entry and exit of the first fluid, a second inlet opening and outlet opening for entry and exit of the second fluid, and an expansion valve for the first fluid that is built onto or integrated into the rest of the heat exchanger. The evaporator incorporates a shutoff unit for the first fluid that is built onto or integrated into the rest of the heat exchanger.

13 Claims, 7 Drawing Sheets

(56) References Cited

U.S. PATENT DOCUMENTS

| | | |
|---|---|---|
| 2009/0249810 A1 | 10/2009 | Neumeister et al. |
| 2010/0243200 A1 | 9/2010 | Baker, Jr. et al. |
| 2011/0146266 A1 | 6/2011 | Weinbrenner et al. |
| 2012/0291987 A1* | 11/2012 | Himmer et al. .................. 165/42 |

FOREIGN PATENT DOCUMENTS

| | | |
|---|---|---|
| DE | 101 28 164 A1 | 12/2002 |
| DE | 600 34 071 T2 | 12/2007 |
| DE | 10 2008 017 113 A1 | 10/2009 |
| DE | 10 2009 015 653 A1 | 11/2009 |
| DE | 10 2008 028 290 A1 | 12/2009 |
| DE | 10 2010 012 869 A1 | 9/2010 |
| DE | 10 2009 054 186.1 * 5/2011 .............. F25B 29/00 |
| EP | 1 637 709 A2 | 3/2006 |
| EP | 1 906 126 A2 | 4/2008 |
| EP | 2 107 328 A1 | 10/2009 |
| WO | WO 02/01124 A1 | 1/2002 |

\* cited by examiner

HEAT EXCHANGER

This nonprovisional application claims priority under 35 U.S.C. §119(a) to German Patent Application No. DE 10 2011 081 886.3, which was filed in Germany on Aug. 31, 2011, and which is herein incorporated by reference.

BACKGROUND OF THE INVENTION

1. Field of the Invention

The invention relates to an evaporator, a system for a motor vehicle for heating and/or cooling a battery, and a motor vehicle air conditioning system.

2. Description of the Background Art

Batteries of hybrid or electric vehicles must be heated or cooled in order to achieve an adequate operating temperature for the battery, for example in a temperature range between 0° C. and 40° C. When electrical energy is drawn from the battery or the battery is charged, the battery gives off heat; in consequence, the battery must be cooled so that it does not heat to temperatures of above 30° C. or 40° C. At low outdoor temperatures, for example below 0° C., heating of the battery is necessary so that electrical energy can be drawn from the battery and also so that charging with electrical energy is possible. To this end, the hybrid or electric vehicle has a coolant circuit with which the battery can be cooled and heated.

DE 101 28 164 A1, which corresponds to U.S. Pat. No. 6,705,101, which is incorporated herein by reference, and which discloses a vehicle cooling system for an electric or hybrid vehicle. The vehicle cooling system has a coolant circuit that is thermally coupled to a battery. Also built into the coolant circuit with the battery is an evaporator of a refrigeration circuit with a condenser, a compressor, and an expansion valve. The coolant circuit with the battery can be cooled by means of the evaporator, with the result that the battery can also be cooled by means of the refrigeration circuit. In addition, it is known to couple the coolant circuit for the battery with an ambient air heat exchanger in such a vehicle cooling system so that the battery can be cooled by emission of the heat to the ambient air without the refrigeration circuit being operated when outdoor temperatures are low.

From DE 10 2008 017 113 A1 is known an evaporator as heat exchanger for a motor vehicle. A plurality of plates are stacked parallel to one another as a heat exchanger in a plate-type or sandwich construction. A first flow chamber for refrigerant as the first fluid and a second flow chamber for a second fluid are formed between the plates so that heat can be transmitted from the second fluid to the refrigerant.

DE 195 23 475 C1 discloses a plate-type heat exchanger, in particular an oil cooler, having a stack of heat exchanger plates that are interleaved and connected to one another by joining techniques to form separate flow passages for the heat-exchanging media, and in which the inlet and outlet ports for at least one medium are located on the same side of the plate stack, having inserts provided in the inlet and outlet passages for flow redirection in a serpentine pattern, wherein one insert essentially blocks one inlet and outlet passage and the other insert lines portions of the other inlet or outlet passage in the manner of a sleeve, wherein the inserts are produced as a single injection molded part connected by a connecting part, and in that the inserts are removably attached in the inlet passage and in the outlet passage.

EP 2 107 328 A1, which corresponds to US 20090249810, which is herein incorporated by reference, discloses an evaporator, in particular for a motor vehicle, comprising a plurality of plates stacked parallel to one another in a vertical direction with apertures that are aligned with one another for supply and return of a first fluid implemented as refrigerant and of a second fluid, wherein formed between two adjacent plates are a flow passage of a first type for carrying the first fluid in alternation with a flow passage of a second type for carrying the second fluid, wherein a heat-transferring area of the plates has a length in the direction of refrigerant flow and a width perpendicular thereto, wherein the ratio of the length to the width is no greater than approximately 1.3.

Heat exchangers or chillers in plate-type constructions are used in systems to cool the batteries of hybrid or electric vehicles using a refrigeration circuit. In these systems, the heat exchanger or chiller has a plate-type construction and comprises a plurality of stack plates stacked atop one another such that a first fluid passage for the refrigerant and a second fluid passage for the coolant, for example water with an antifreeze, are formed between the stack plates. The refrigerant here is routed through the first fluid passage between the stack plates through at least two, preferably at least three, sections of the first fluid passage between the stack plates in opposite directions, which is to say in a serpentine pattern. In deviation from this, the refrigerant can also be routed in just one direction through the heat exchanger. It is necessary here to be able to shut off the heat exchanger as evaporator in the refrigeration circuit. For this reason, a shutoff unit is necessary, which requires additional installation space outside of the heat exchanger on the refrigerant lines. The shutoff unit is necessary because two heat exchangers or evaporators are arranged in the refrigeration circuit of the system, and they must be turned on and off individually.

SUMMARY OF THE INVENTION

It is therefore an object of the present invention to provide a heat exchanger, a system for a motor vehicle for heating and/or cooling a battery, and a motor vehicle air conditioning system, in which the heat exchanger and the shutoff unit require little installation space, and which is easy and economical to manufacture.

This object is attained in en embodiment, with an evaporator as heat exchanger or chiller in a plate-type construction, comprising a plurality of stack plates stacked atop one another such that a first fluid passage for a first fluid as refrigerant and a second fluid passage for a second fluid as coolant, for example water, a mixture of water and Glysantin, or air, are formed between the stack plates, the stack plates have first apertures as a first fluid passage for supply and return of the first fluid, the stack plates have second apertures as a second fluid passage for supply and return of the second fluid, preferably have at least one redirection device that closes at least a first aperture so that the first fluid is carried in a serpentine pattern through at least two, preferably at least three, sections of the first fluid passage between the stack plates in opposite directions through the heat exchanger, further comprising a first inlet opening and outlet opening for entry and exit of the first fluid, a second inlet opening and outlet opening for entry and exit of the second fluid, an expansion valve for the first fluid as refrigerant and the expansion valve is built onto or integrated into the rest of the heat exchanger, preferably the first inlet or outlet opening is composed of a dip tube and the first fluid can be caused to enter the first fluid passage through the dip tube, so that the first inlet and outlet openings are implemented on the same side of the heat exchanger, wherein the evaporator incorporates a shutoff unit for the first fluid as refrigerant and the shutoff unit is built onto or integrated into the rest of the heat exchanger. The evaporator provided as a heat exchanger or chiller thus also incorporates a shutoff unit that is built onto or integrated into the rest of the heat exchanger. The first fluid passage for the refrigerant can be fully closed with the shutoff unit, thereby preventing the passage of refrigerant through the evaporator. As a general rule, this is necessary so as to be able to prevent the passage of refrigerant through the evaporator in a system for heating and/or cooling a battery and a vehicle passenger compartment and thereby to be able to shut off the cooling of the battery. The first fluid passage can be fully closed and opened with the shutoff unit. Preferably, this can be controlled and/or regulated by a control unit.

In an embodiment, the evaporator has no redirection device, so that the first fluid can be guided or flows through the evaporator in only one direction.

In particular, the expansion valve and/or shutoff unit can be attached to the rest of the heat exchanger by a connecting flange. The expansion valve and/or the shutoff unit are thus attached to the rest of the heat exchanger by means of the connecting flange. The expansion valve and/or shutoff unit is, for example, removably attached to the connecting flange by means of an interlocking and/or frictional connection, e.g., a screw connection or snap-in connection.

In another embodiment, the connecting flange is attached to the rest of the evaporator in a material-to-material and/or frictional and/or interlocking fashion, in particular by a soldered connection. The connecting flange preferably is soldered to the rest of the evaporator in the soldering furnace during soldering of the heat exchanger.

In an embodiment, the expansion valve has a constant, unchangeable cross-sectional flow area, in other words the expansion valve is designed only as at least one opening. The at least one opening, in particular only one opening, of the expansion valve is embodied on a part of the evaporator in this case.

The expansion valve can be designed as an opening in the shutoff unit or as an opening in the connecting flange. For example, the shutoff unit or the connecting flange has a narrow point or orifice that constitutes the opening of the expansion valve.

In an embodiment, the expansion valve can be designed as an opening, in particular a flow inlet opening or flow outlet opening, or as an orifice or narrow point on the dip tube. For example, a flow inlet opening for entry of refrigerant is provided on the dip tube as the flow opening, and a flow outlet opening as the flow opening for the exit of the refrigerant is present. In this design, for example, the flow outlet opening has a suitable cross-sectional flow area, e.g., 0.2 mm$^2$, so that the flow outlet opening forms the expansion valve with the constant, unchangeable cross-sectional flow area.

In an embodiment, the cross-sectional flow area of the expansion valve with constant cross-sectional flow area can be between 0.03 mm$^2$ and 0.3 mm$^2$, in particular between 0.05 mm$^2$ and 0.2 mm$^2$ for a cooling output, e.g., average battery waste heat, for the second fluid of 0.2 kW, and for a cooling output of 1.8 kW is between 0.3 mm$^2$ and 1.2 mm$^2$, and in particular between 0.3 mm$^2$ and 1 mm$^2$, especially preferably between 0.4 mm$^2$ and 0.75 mm$^2$; for a cooling output between 0.2 kW and 1.8 kW, the cross-sectional flow area is linearly interpolated between these values. An especially favorable operation of the refrigeration circuit at the evaporator is the result with such cross-sectional flow areas of the expansion valve.

In another embodiment, the expansion valve can be an electronic expansion valve, and the shutoff unit includes the electronic expansion valve. The expansion valve is designed as an electronic expansion valve, and the cross-sectional flow area of the expansion valve is variable, preferably continuously, in this implementation. The variation of the cross-sectional flow area of the electronic expansion valve can be controlled and/or regulated by a control unit as a function of at least one parameter, e.g., the temperature of the refrigerant at the inlet passage and/or the outlet passage, and/or the quantity of refrigerant passed through the evaporator per unit time. With the electronic expansion valve, it is also possible to vary the cross-sectional flow area to zero, so that the electronic expansion valve also constitutes the shutoff unit.

In an embodiment, the dip tube pierces the at least one redirection device, so that the first fluid directed through the dip tube can also be directed through the at least one redirection device.

In another embodiment, the at least one redirection device is designed as a baffle plate or a separate sealing element, e.g., sealing plate. A baffle plate is designed, for example, as a stack plate that has only a first aperture instead of two apertures, so that as a result the first fluid is redirected into the space between the corresponding first apertures and consequently flows through the first fluid passage between the stack plates in the opposite direction in a serpentine pattern. In this design, a separate sealing element, for example a sealing plate or sealing lip, closes a first aperture of the plate stack, so that a first aperture is closed with an additional component in this way.

In an embodiment, the expansion valve can be attached, preferably directly, to the rest of the heat exchanger, for example to a cover plate or to a base plate, without a connecting flange.

In an embodiment, the heat exchanger can include a fastening device for fastening the heat exchanger, and the fastening device preferably is composed of the connecting flange. In a variation thereof, the fastening device can also be designed as an additional part supplementary to the connecting flange or the connecting block. Such a fastening device is fastened to the cover plate or the base plate in a material-to-material manner by soldering, for example. In this design, the fastening device as a separate part or a connecting flange has at least one, preferably multiple, bores, and fasteners, for example screws or studs, can be fastened in these bores to attach the heat exchanger to another component, for example a body of a motor vehicle.

In another embodiment, the components of the heat exchanger, in particular the dip tube, the stack plates, the cover plate, the base plate, the connecting flange, and/or the expansion valve, are made at least partially, in particular entirely, of metal, in particular of steel, iron, or aluminum, or nonferrous metal.

In an embodiment, the components of the heat exchanger can be joined to one another in a material-to-material manner, in particular by means of soldering.

In an embodiment, the components of the heat exchanger can have a plating with solder for joining the components of the heat exchanger in a material-to-material manner by means of soldering in a soldering furnace.

In an embodiment, the cover plate and/or the base plate can have a greater thickness than the stack plates, preferably greater by a factor of at least 1.5, 2, 3, or 5.

In another embodiment, the length of the dip tube can be less than the extent of the stack perpendicular to a plane spanned by the stack plates.

In an embodiment, the dip tube can be designed to be circular, elliptical, polygonal, e.g., three- or four-sided, in particular square, in cross-section.

A system according to the invention for a motor vehicle for heating and/or cooling a battery and a motor vehicle passenger compartment, can include a coolant circuit for cooling the battery and the motor vehicle passenger compartment, a refrigeration circuit with a condenser, a compressor, a first expansion valve, a second expansion valve, a first AC evaporator for cooling the motor vehicle passenger compartment, and a second evaporator for cooling the battery in that the second evaporator as a heat exchanger is thermally coupled to the coolant circuit, and wherein the second evaporator can be designed as an evaporator described in the instant patent application.

In an embodiment, the stack plates of the heat exchanger are arranged in a block composed of stack plates stacked atop one another.

In an embodiment, the stack plates are arranged essentially parallel atop one another, e.g., with a deviation of less than 10°, 5°, or 2°.

The heat exchanger can have at least 5, 6, 10, 20, 30, 38, 50, 56, or 68 stack plates.

A motor vehicle air conditioning system according to an embodiment of the invention can include a system described in the instant patent application and/or the motor vehicle air conditioning system can include an evaporator described in the instant patent application.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
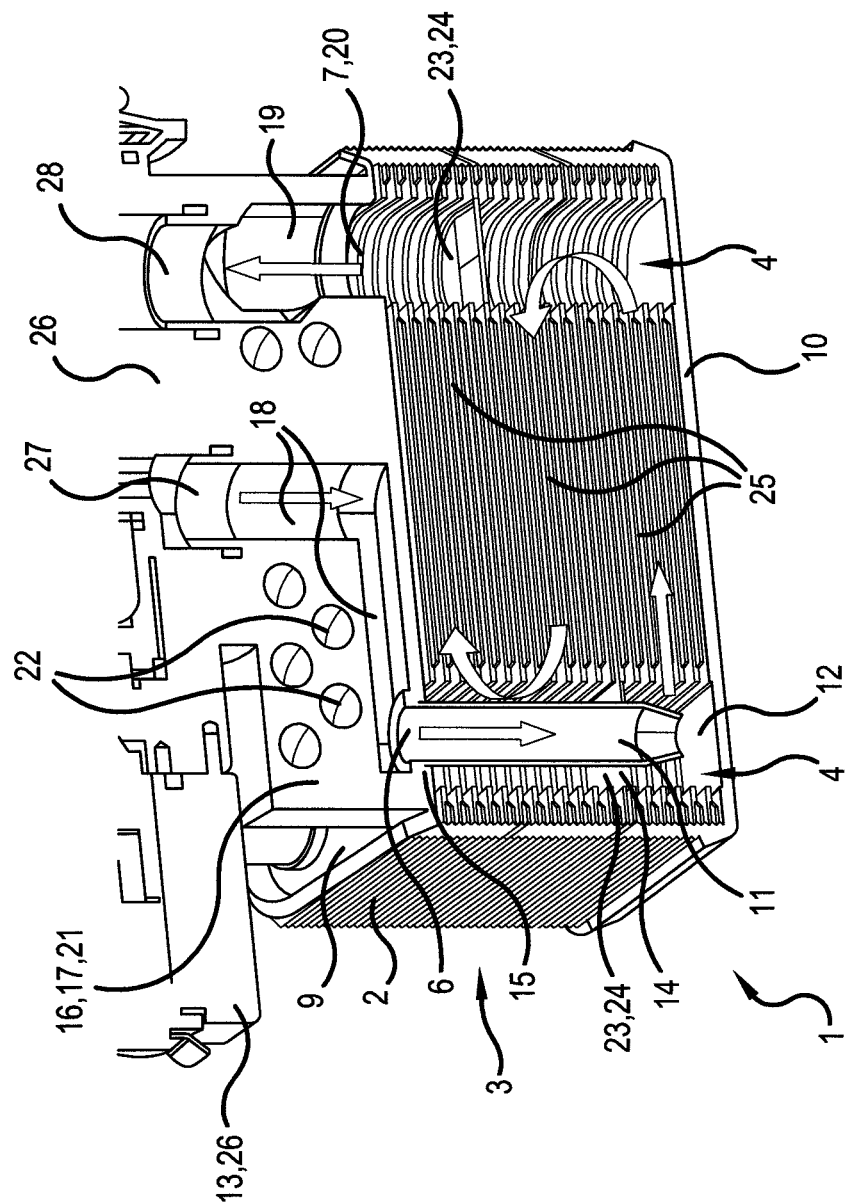
FIG. 1 is a perspective, cross-sectional view of a heat exchanger in an exemplary embodiment with an expansion valve.

The evaporator 1 as heat exchanger 1 or chiller 1 shown in a side view in FIG. 1 is used in a system 34 for heating and/or cooling a battery 40 of a motor vehicle in the form of a hybrid or electric vehicle. The heat exchanger 1 here is implemented as a plate-type heat exchanger 1. A plurality of stack plates 2 with first and second apertures 4, 5 or openings 4, 5 are stacked atop one another to form a stack 3. As a result, a first fluid passage and a second fluid passage for conducting a fluid are formed between the stack plates 2. As a result, heat can be transferred from the first fluid to the second fluid or vice versa. The first apertures 4 likewise form the first fluid passage, through which the first fluid in the first fluid passage between the stack plates 2 flows in and out. The same also applies analogously to the second fluid passage and the second apertures 5. The top end of the stack 3 composed of the stack plates 2 as shown in FIG. 1 is closed at the top by a cover plate 9, and at the bottom the stack 3 is closed by a base plate 10. In this design, the cover plate 9 and base plate 10 have a greater thickness than the stack plates 2. The cover plate 9 also has first apertures 4 or openings and second apertures 5 or openings 5 for passage of the first and second fluids. The two first apertures 4 are implemented only in the cover plate 9 and not in the base plate 10, so that the two first apertures 4 are implemented on one side of the stack 3. A first aperture 4 forms a first inlet opening 6 for the first fluid, in this case refrigerant, and another first aperture 4 on the cover plate 9 forms a first outlet opening 7 for the refrigerant. In analogous fashion, a second inlet opening 8 (FIG. 3) and a second outlet opening (not shown) on the cover plate 9 form the inlet and outlet opening 8 for the second fluid, in this case coolant. The second fluid is guided through the second fluid passage between the stack plates 2 in only one direction of flow through the second fluid passage, without redirection and not in a serpentine pattern.

The first aperture 4 in the cover plate 9, which forms a first inlet opening 6 for the refrigerant, has a dip tube 11 in this implementation. The dip tube 11 here is fastened in a material-to-material manner by means of a soldered connection to the cover plate 9 in the region of the first aperture 4 or the first inlet opening 6. In this design, this fastening of the dip tube 11 to the cover plate 9 constitutes a fixed bearing 15 for the dip tube 11. The refrigerant is guided through the first fluid passage between the stack plates 2 in a serpentine pattern through three sections 25 in opposite directions through the first fluid passage between the stack plates 2. For this purpose, it is necessary for the first apertures 4 of the stack plates 2 to be closed at two places. To this end, two stack plates 2 have no first apertures 4 and thus form a baffle plate 24 as redirection device 23. In FIG. 1, a lower baffle plate 24 is present at the first apertures 4 shown on the left side in FIG. 1, separating the first apertures 4 on the left, and an upper baffle plate 24 is present at the first apertures 4 on the right, separating the space at one point from the first fluid passage formed by right-hand first apertures 4. The lower baffle plate 4 in this design has an opening through which the dip tube 11 is passed. A bottom end of the dip tube 11 here has an axial flow opening 12 through which the liquid refrigerant entering at the first inlet opening 6 flows out of the dip tube 11 into the first fluid passage below the baffle plate 24. After flowing out of the flow opening 12, the refrigerant flows from left to right through the lowest section 25, is then redirected in the first fluid passage in the region of the right-hand first apertures 4, and then flows in the opposite direction through the middle section 25 of the first fluid passage. Next, the refrigerant is once again redirected at the left-hand first apertures 4 above the baffle plate 24 and outside the dip tube 11, and flows through the upper section 25, and then flows out of the upper section 25 into the first fluid passage above the upper baffle plate 24 in the right-hand first apertures 4, and then flows back out of the heat exchanger 1 or the stack 3 of stack plates 2 through the first outlet opening 7. The connection between the dip tube 11 and the baffle plate 24 here is designed as a floating bearing 14, so that the dip tube 11 is movable relative to the baffle plate 24 as a floating bearing 14 in the direction of a longitudinal axis (not shown) of the dip tube 11. The flow opening 12 of the dip tube 11 is axial to the longitudinal axis of the dip tube 11 in this implementation.

A connecting flange 16 or connecting block 17 made of metal is fastened to the cover plate 9 by means of a soldered connection. The connecting flange 16 here has an inlet passage 18 for entry of the refrigerant into the heat exchanger 1 and an outlet passage 19 for the refrigerant to exit the heat exchanger 1. In this design, the outlet passage 19 is designed to be flush with the first outlet opening 7, and the inlet passage 18 has two bends or curves of approximately 90° as redirection points. Moreover, a connecting flange outlet opening 20 as the end of the outlet passage 19 is also flush with the first outlet opening 7 at a stack plate 7 or at the cover plate 9. The first outlet opening 7 here also constitutes a right-hand first aperture 4. The connecting block 17 is also a fastening device 21 for fastening the heat exchanger 1 to other components, for example a body of a motor vehicle (not shown). To this end, the fastening device 21 or the connecting flange 16 has multiple bores 22. By means of these bores 22, a mechanical connection can be produced between the fastening device 21 and another component using screws or studs (not shown) in the bores 22. In a variation from the material-to-material soldered connection between the connecting block 17 and the cover plate 9, the connecting flange 16 can also be connected to the cover plate 9 in a liquid-tight manner with a screw connection (not shown) and at least one O-ring seal.

An electronic expansion valve 26 with an inlet passage 27 and an outlet passage 28 is fastened to the connecting flange 16. The expansion valve 26 here is connected to the connecting flange 16 in a liquid-tight manner, for example by a material-to-material joining, for example a laser or plasma weld, a soldered connection, or another joining method such as adhesive bonding or forming. In a variation herefrom, the expansion valve 26 can also be connected to the connecting flange 16 by means of a screw connection or riveted connection, and a liquid-tight connection between the expansion valve 26 and the connecting flange 16 (not shown) is present by means of at least one O-ring seal. In this case, the inlet passage 18 of the connecting flange 16 terminates flush with the inlet passage 27 of the expansion valve 26, and the outlet passage 19 of the connecting flange 16 terminates flush with the outlet passage 28 of the electronic expansion valve 26. The cross-sectional flow area of the electronic expansion valve 26 is variable, and can be controlled and/or regulated by a control unit (not shown) as a function of at least one parameter, e.g., the temperature of the refrigerant. The cross-sectional flow area of the electronic expansion valve 26 can also be varied to zero, so that the electronic expansion valve 26 also constitutes a shutoff unit 13 for shutting off a flow of refrigerant as the first fluid through the evaporator 1. Preferably, the electronic expansion valve 26 does not have the outlet passage 28 in a variation from the representation in FIG. 1 to FIG. 4, so that only the inlet passage 27, but not the outlet passage 28, passes through the electronic expansion valve 26.

Figure 2:
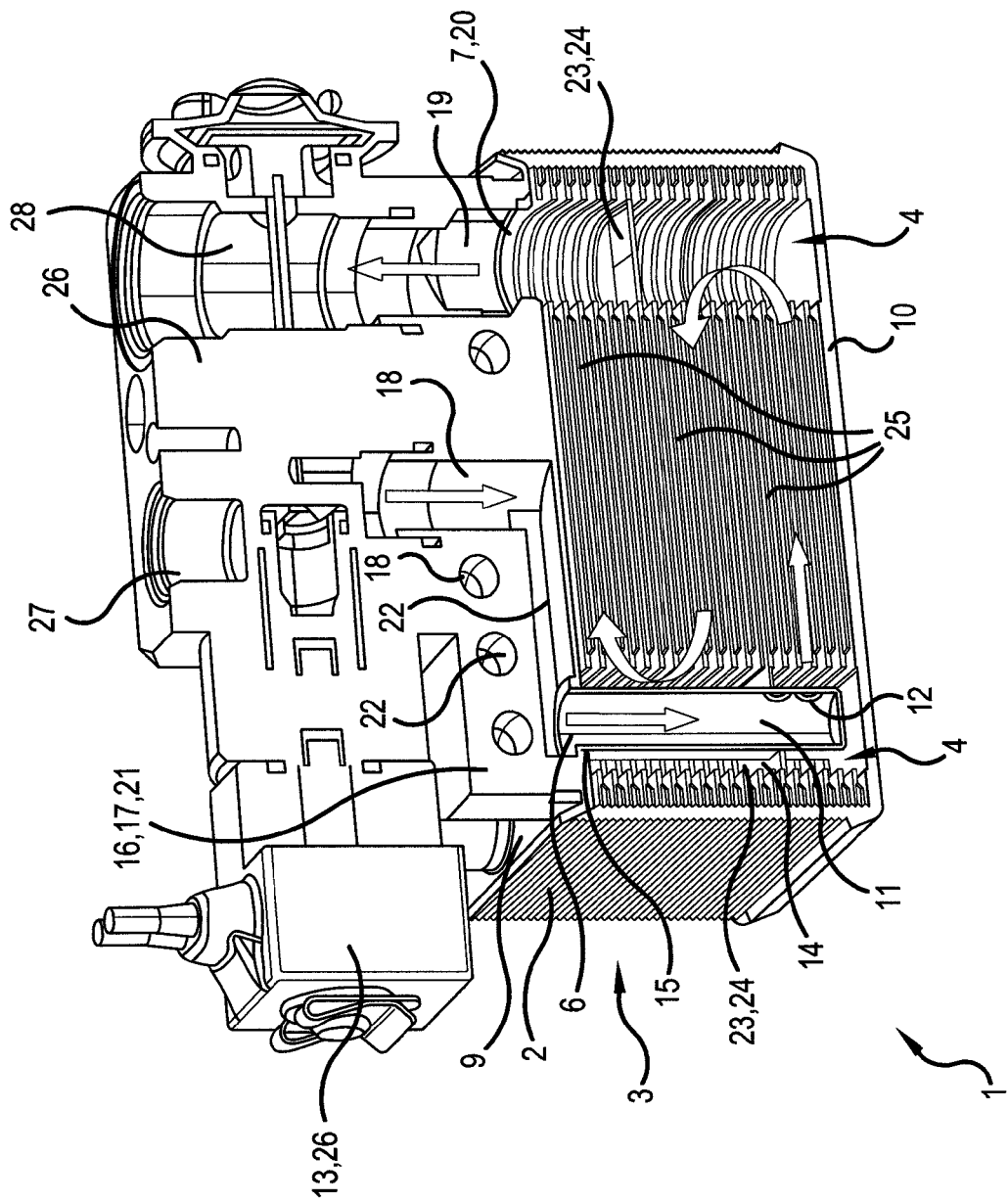
FIG. 2 is a perspective, cross-sectional view of the heat exchanger in an exemplary embodiment with the expansion valve.
Figure 3:
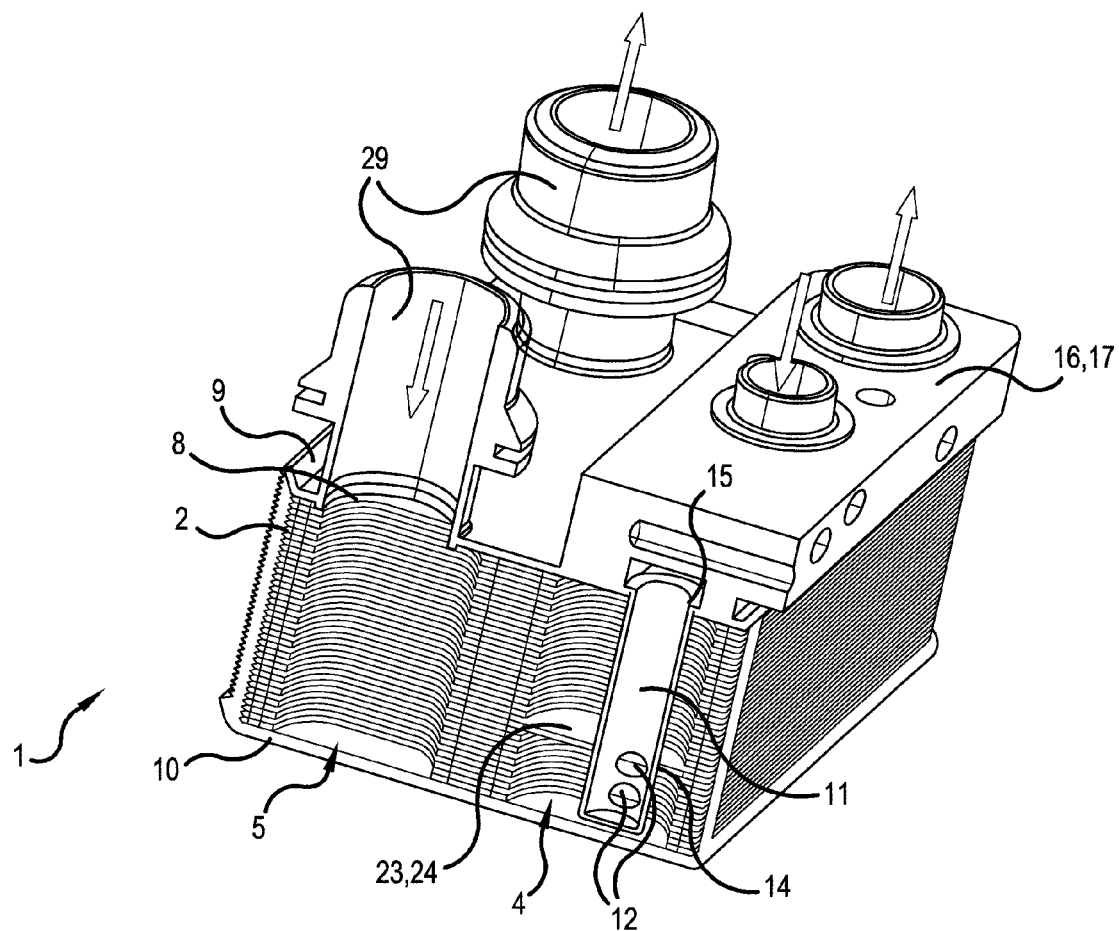
FIG. 3 is another perspective, cross-sectional view of the heat exchanger from FIG. 2 without expansion valve.
Figure 4:
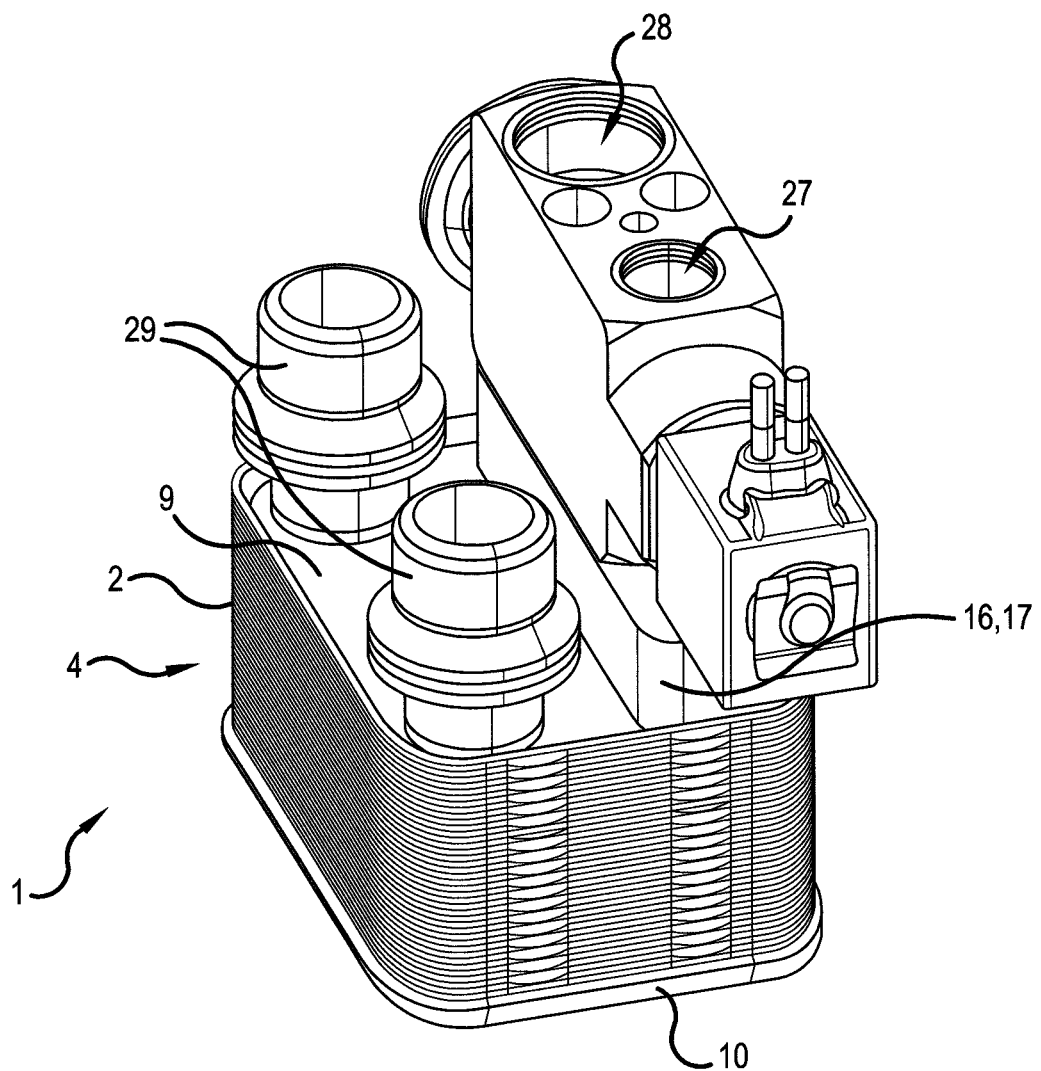
FIG. 4 is another perspective view of the heat exchanger from FIG. 2 with expansion valve.

In FIG. 2 through 4, a second exemplary embodiment of the heat exchanger 1 is shown. The material that follows will primarily describe only the differences from the first exemplary embodiment shown in FIG. 1. The dip tube 11 has two radial flow openings 12. The refrigerant flows through the two flow openings 12, which are radial with regard to the longitudinal axis, into the first fluid passage below the baffle plate 24 at the left-hand first apertures 4. FIG. 3 also shows two coolant fittings 29 for the entry and exit of the coolant, for example water with an antifreeze. Second apertures 5 are formed on the stack plates 2 at the coolant fittings 29 flush with the coolant fittings 24. In FIG. 3, the second apertures 5 through which the coolant enters the heat exchanger 1 are shown.

In another exemplary embodiment (not shown) of the heat exchanger 1 with the electronic expansion valve 26, the expansion valve 26 is fastened to the cover plate 9 without the connecting flange 16, for example by means of a soldered connection. In this case, the first outlet opening 7 on the stack 3 of stack plates 2, with the cover plate 9 and the base plate 10 as the rest of the heat exchanger 1, is made flush with the outlet passage 28 of the expansion valve 26. Here, after passing through the inlet passage 27, the liquid refrigerant entering the expansion valve 26 through the inlet passage 27 is directed through an additional refrigerant pipe from the end of the inlet passage 27 to the first inlet opening 6 or the dip tube 11. This additional refrigerant pipe as a separate component has a small size or extent, since no redirection of the refrigerant from one side of the rest of the heat exchanger 1 to the other side is necessary, and its function corresponds to the inlet passage 18 of the connecting flange 16 in the first and second exemplary embodiments.

Figure 5:
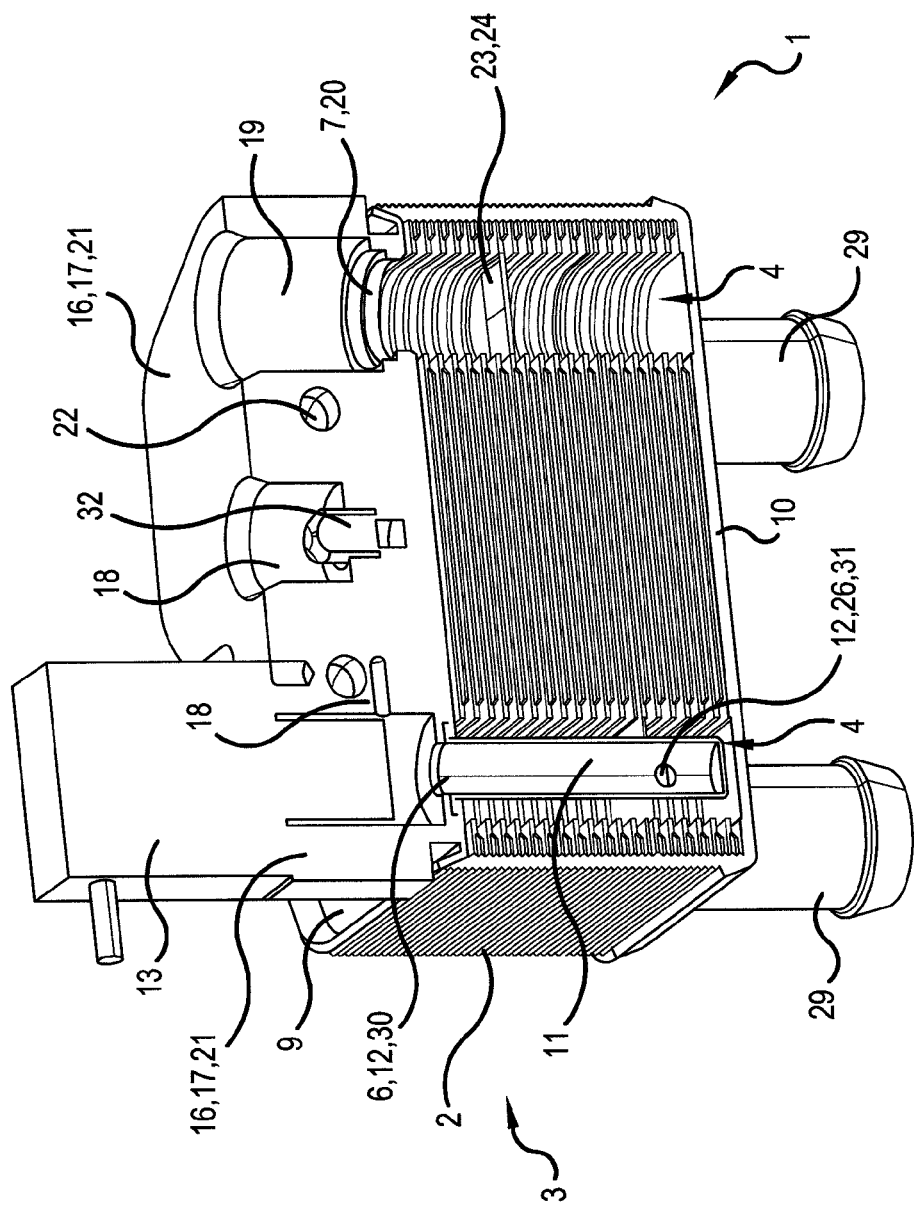
FIG. 5 is a perspective, cross-sectional view of the heat exchanger in an exemplary embodiment with the expansion valve.

FIG. 5 shows a third exemplary embodiment of the evaporator 1 as heat exchanger 1. The material that follows will primarily describe only the differences from the first and second exemplary embodiments shown in FIG. 1 to FIG. 4. The expansion valve 26 is an expansion valve 26 with a constant, unchangeable cross-sectional flow area, which is to say that the expansion valve 26 is not an electronic expansion valve. Furthermore, the shutoff unit 13 is built onto or integrated into the evaporator 1 as an additional and supplementary component. The refrigerant is directed through an inlet passage 18 with a filter 32 on the connecting flange 16 through the inlet passage 18 to the shutoff unit 13 and the dip tube 11. The dip tube 11 has a flow inlet opening 30 as flow opening 12, and the refrigerant enters the dip tube 11 from the inlet passage 18 through the flow inlet opening 30. The refrigerant flows into a bottommost section 25 of the evaporator 1 through a flow outlet opening 31 as flow opening 12. In this design, the cross-sectional flow area of the flow outlet opening 31 is designed, for example with a cross-sectional flow area of 0.64 mm$^2$, such that the flow outlet opening 31 forms the expansion valve 26 of the evaporator 1 at the dip tube 11. With the shutoff unit 13, the passage of refrigerant through the evaporator 1 can be fully interrupted and shut off. The shutoff unit 13 thus serves to either fully close or fully open the flow inlet opening 30 of the dip tube 11. The flow outlet opening 31 thus constitutes the expansion valve 26.

In another exemplary embodiment that is not shown, the expansion valve 26 is designed with a constant, unchangeable cross-sectional flow area that represents only one opening, as an opening on the shutoff unit 13 or as an opening in the connecting flange 16, for example as an orifice or narrow point.

Figure 6:
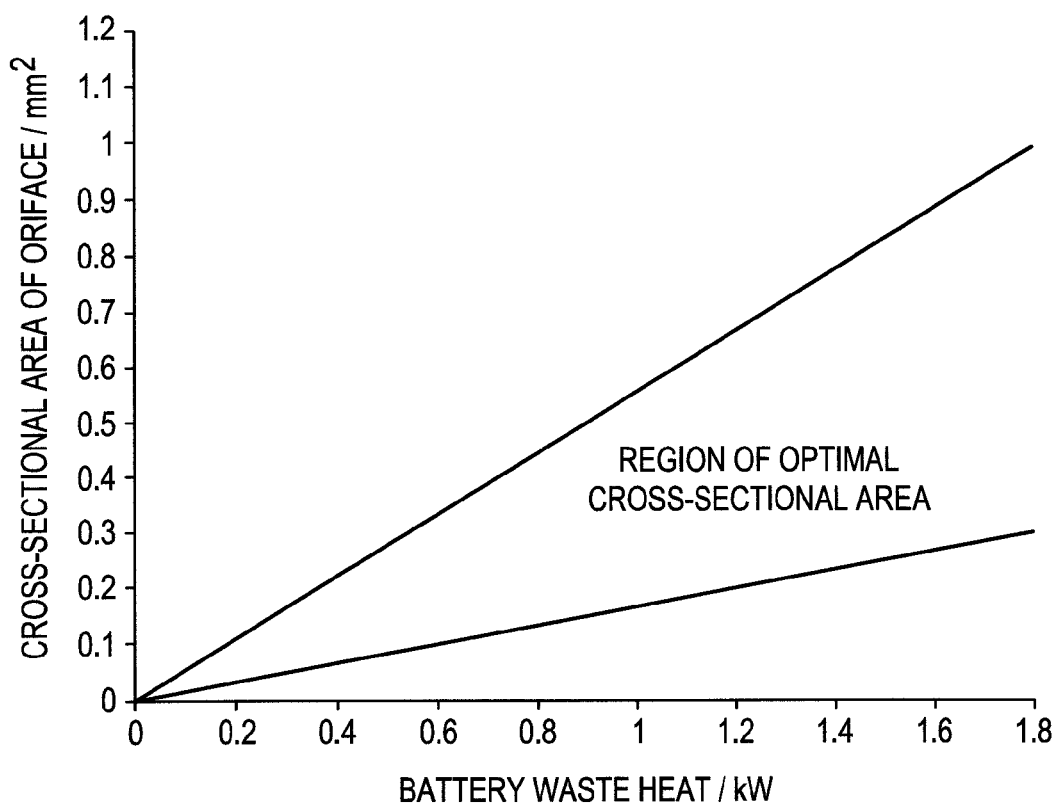
FIG. 6 is a diagram of an optimum cross-sectional flow area of an opening of the expansion valve from FIG. 5 as a function of the cooling output or waste heat of a battery to be cooled.

The expansion valve 26 with constant, unchangeable cross-sectional flow area is designed essentially only as an opening with a suitable cross-sectional flow area for passage of refrigerant through this opening. The evaporator 1 can cool a battery 40, for example, by the means that the second fluid represents a coolant for cooling the battery 40. FIG. 6 shows optimal cross-sectional flow areas for this opening of the expansion valve 26 with constant, unchangeable cross-sectional flow area for different cooling outputs or waste heat outputs of the battery 40. For example, with a battery waste heat of 1 kW, the optimal cross-sectional flow area of this opening of the expansion valve 26 is approximately 0.3 mm$^2$. With such an appropriate design of the opening of the expansion valve 26 with constant, unchangeable cross-sectional flow area, optimal operation for cooling the battery 40 can be ensured.

Figure 7:
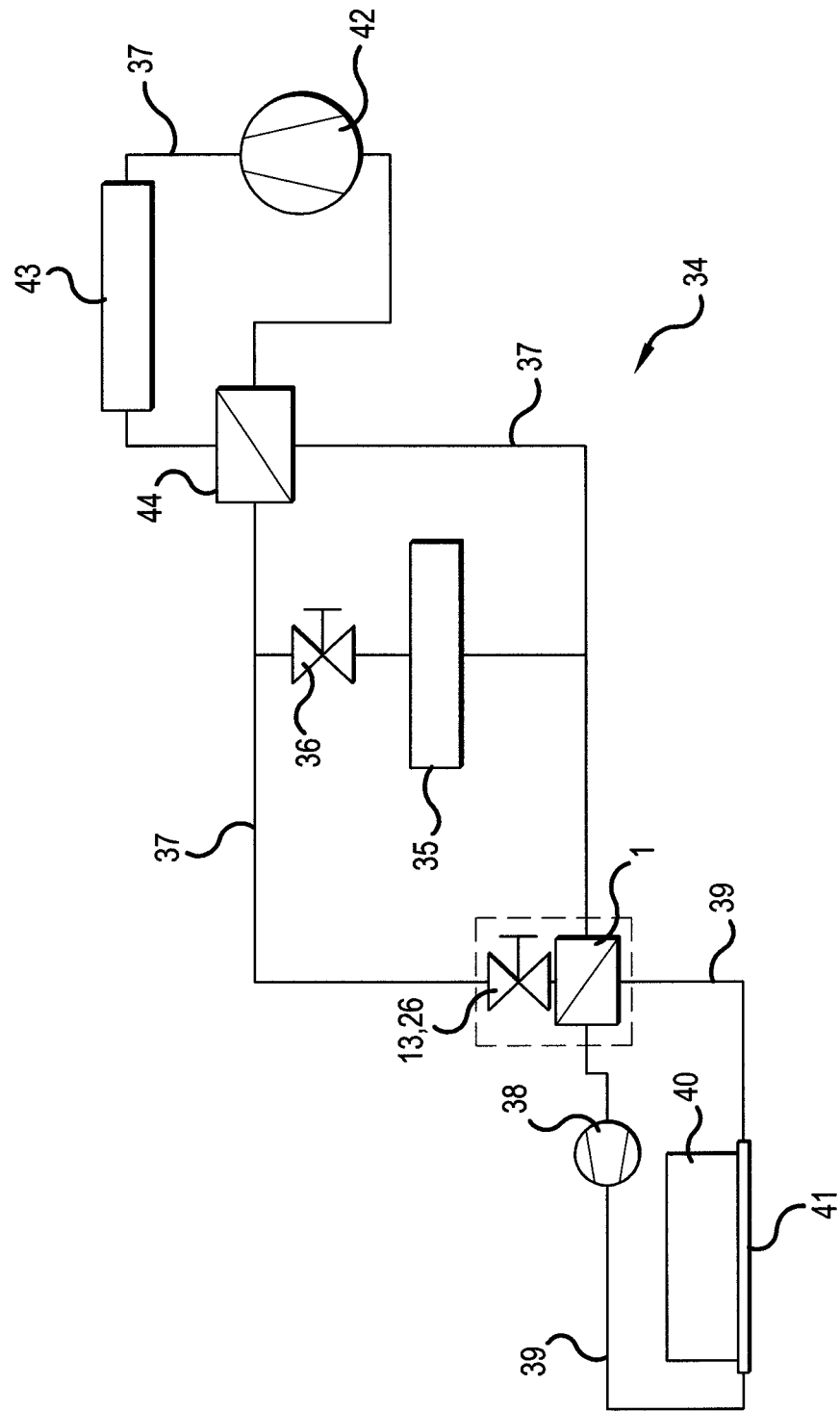
FIG. 7 is a simplified representation of a system for heating and/or cooling a battery and a motor vehicle passenger compartment.

FIG. 7 shows a system 34 for cooling the battery 40 and for cooling a motor vehicle passenger compartment. The motor vehicle passenger compartment is cooled with a first AC evaporator 35, and the refrigerant is directed through the AC evaporator 35 through an expansion valve 36 with a shutoff function. A refrigeration circuit comprises a condenser 43, a compressor 42, and refrigerant lines 37. The refrigerant lines 37, or the refrigerant directed through the refrigerant lines 37 to the compressor 42, is thermally coupled by an optional heat exchanger 44 to a second refrigerant circuit. In contrast thereto, the heat exchanger 44 can also be omitted, and the refrigerant can be directed directly from the condenser 43 to the first AC evaporator 35 and the second evaporator 1. The second evaporator 1 is designed as a heat exchanger 1 or chiller 1, and in the evaporator 1 a first fluid, namely the refrigerant, flows through a first fluid passage, and a second fluid, namely the coolant that flows through the coolant lines 39 for cooling the battery 40, e.g., water or air, flows through a second fluid passage. The battery 40 has a battery cooling plate 41 through which the coolant flows. A water pump 38 as coolant pump pumps the coolant through the coolant circuit with the coolant lines 39. The evaporator 1 here is designed as an evaporator 1 shown in FIG. 1 through FIG. 5, which is to say that both the shutoff device 13 and the expansion valve 26 are integrated into the evaporator 1. This can be accomplished by the means that either the expansion valve 26 is an electronic expansion valve 26, or the expansion valve 26 has a constant, unchangeable cross-sectional flow area and the shutoff device 13 is additionally built onto or integrated into the evaporator 1 as a separate component.

Viewed as a whole, considerable advantages are associated with the evaporator 1 in accordance with the invention. In addition to the expansion valve 26, the shutoff device 13 is additionally built onto or integrated into the evaporator 1. Consequently, the shutoff device 13 need not be separately fastened to the refrigerant lines 37. Installation space can be saved advantageously in this way. The shutoff device 13 is attached to the rest of the evaporator 1 by a material-to-material, interlocking, and/or frictional connection, e.g., to the connecting flange 16 or a cover plate 9 or another part of the evaporator 1. As a result, no additional external refrigerant line 37 is hydraulically interposed between the shutoff device 13 and the evaporator 1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An evaporator comprising:
a first fluid passage for a first fluid;
a second fluid passage for a second fluid;
a plurality of stack plates stacked atop one another such that the first fluid passage and the second fluid passage are formed between the stack plates, the stack plates having first apertures for supply and return of the first fluid and second apertures for supply and return of the second fluid;
a first inlet opening and first outlet opening for entry and exit of the first fluid;
a second inlet opening and second outlet opening for entry and exit of the second fluid;
an expansion valve for the first fluid, the expansion valve being arranged onto or integrated into the evaporator; and
a shutoff unit for the first fluid, the shutoff unit being arranged onto or integrated into the evaporator,
wherein the first inlet opening or first outlet opening comprises a dip tube,
wherein the first fluid enters the first fluid passage through the dip tube so that the first inlet opening and first outlet opening are arranged on a same side of the heat exchanger, and
wherein the entire expansion valve is a constant, unchangeable cross-sectional flow area.

2. The evaporator according to claim 1, wherein the expansion valve and/or the shutoff unit is attached to the evaporator via a connecting flange.

3. The evaporator according to claim 2, wherein the connecting flange is attached to the evaporator in a material-to-material and/or frictional and/or interlocking fashion and/or by a soldered connection.

4. The evaporator according to claim 1, wherein the expansion valve is configured as an opening in the shutoff unit or as an opening in a connecting flange of the evaporator.

5. The evaporator according to claim 1, wherein the expansion valve is configured as an opening, a flow inlet opening, a flow outlet opening, an orifice, or a narrow point at the dip tube.

6. The evaporator according to claim 1, wherein a cross-sectional flow area of the expansion valve having a constant cross-sectional flow area is between 0.03 mm$^2$ and 0.3 mm$^2$ or between 0.05 mm$^2$ and 0.2 mm$^2$ for a cooling output for the second fluid of 0.2 kW, and for a cooling output of 1.8 kW is between 0.3 mm$^2$ and 1.2 mm$^2$ or between 0.3 mm$^2$ and 1 mm$^2$ or between 0.4 mm$^2$ and 0.75 mm$^2$.

7. The evaporator according to claim 1, wherein the expansion valve is an electronic expansion valve, and wherein the shutoff unit includes the electronic expansion valve.

8. A system for a motor vehicle for heating and/or cooling a battery, the system comprising:
a coolant circuit for cooling the battery and/or a motor vehicle passenger compartment; and
a refrigeration circuit comprising:
a condenser;
a compressor;
a first AC evaporator for cooling the motor vehicle passenger compartment; and
a second evaporator for cooling the battery, the second evaporator being thermally coupled to the coolant circuit,
wherein the second evaporator is an evaporator according to claim 1.

9. A motor vehicle air conditioning system, wherein the motor vehicle air conditioning system comprises an evaporator according to claim 1.

10. The evaporator according to claim 1, wherein the evaporator is a heat exchanger or chiller having a plate-type construction.

11. The evaporator according to claim 1, wherein the first fluid is a refrigerant and the second fluid is a coolant.

12. The evaporator according to claim 1, wherein the first fluid or the second fluid is water or air.

13. An evaporator comprising:
a first fluid passage for a first fluid;
a second fluid passage for a second fluid;
a plurality of stack plates stacked atop one another such that the first fluid passage and the second fluid passage are formed between the stack plates, the stack plates having first apertures for supply and return of the first fluid and second apertures for supply and return of the second fluid;
a first inlet opening and first outlet opening for entry and exit of the first fluid;
a second inlet opening and second outlet opening for entry and exit of the second fluid;
an expansion valve for the first fluid; and
a shutoff unit for the first fluid, the shutoff unit being arranged onto or integrated into the evaporator,
wherein the first inlet opening comprises a dip tube,
wherein the first fluid enters the first fluid passage through the dip tube so that the first inlet opening and first outlet opening are arranged on a same side of the heat exchanger,
wherein the expansion valve has a constant, unchangeable cross-sectional flow area, and
wherein the expansion valve is configured as an opening, a flow inlet opening, a flow outlet opening, an orifice or a narrow point at the dip tube.

* * * * *